United States Patent
Kurian et al.

(10) Patent No.: US 12,020,038 B2
(45) Date of Patent: Jun. 25, 2024

(54) PEER BOOTING OPERATING SYSTEMS ON AN EDGE NETWORK

(71) Applicant: Microsoft Technology Licensing, LLC, Redmond, WA (US)

(72) Inventors: Alphonse Kurian, Summer, WA (US); Arpan Kumar Asthana, Bothell, WA (US); Amit Kumar Saraff, Seattle, WA (US); Chandrasekhar Pasupuleti, Issaquah, WA (US); Paul Karam, Kirkland, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 284 days.

(21) Appl. No.: 17/246,559

(22) Filed: Apr. 30, 2021

(65) Prior Publication Data

US 2022/0350618 A1 Nov. 3, 2022

(51) Int. Cl.
*G06F 9/4401* (2018.01)
*H04L 9/40* (2022.01)

(52) U.S. Cl.
CPC .......... *G06F 9/4416* (2013.01); *G06F 9/4406* (2013.01); *H04L 63/0272* (2013.01); *H04L 63/166* (2013.01)

(58) Field of Classification Search
None
See application file for complete search history.

(56) References Cited

U.S. PATENT DOCUMENTS

| | | | |
|---|---|---|---|
| 7,363,374 B2* | 4/2008 | Paul | G06F 9/4416 709/227 |
| 10,467,019 B2* | 11/2019 | York | H04L 67/06 |
| 2005/0180326 A1 | 8/2005 | Goldflam et al. | |
| 2008/0141015 A1* | 6/2008 | Chalemin | G06F 9/4416 717/177 |
| 2011/0022812 A1* | 1/2011 | van der Linden | H04L 69/08 711/E12.001 |
| 2013/0346576 A1* | 12/2013 | Huang | H04L 61/4511 709/223 |
| 2019/0155614 A1 | 5/2019 | York | |
| 2020/0112435 A1 | 4/2020 | Mueller et al. | |

OTHER PUBLICATIONS

"International Search Report and Written Opinion Issued in PCT Application No. PCT/US22/023568", dated Aug. 22, 2022, 15 Pages.

* cited by examiner

*Primary Examiner* — Fahmida Rahman
(74) *Attorney, Agent, or Firm* — Ray, Quinney & Nebeker; James S. Bullough

(57) ABSTRACT

The present disclosure relates to systems, methods, and computer-readable media for peer booting server nodes on an edge zone. For example, an edge zone may include data plane devices capable of hosting virtual machines and other cloud-based services thereon that provide low-latency services to customers of a cloud computing system. Systems described herein implement an operating system (OS) provisioning system that, in combination with a peer booting system on a server node, facilitates instantiation of an OS on the server node as well as enabling the server node to act as an OS provider service to other server nodes on the edge zone. The systems disclosed herein facilitate fast installation of OS services without overutilizing limited bandwidth resources of a virtual network that connects the server nodes with control plane devices remotely maintained at a datacenter.

20 Claims, 8 Drawing Sheets

PEER BOOTING OPERATING SYSTEMS ON AN EDGE NETWORK

BACKGROUND

A cloud computing system refers to a collection of computing devices on which data can be remotely stored and accessed. Modern cloud computing infrastructures often include a collection of physical server devices organized in a hierarchical structure including computing zones, clusters, virtual local area networks (VLANs), racks, fault domains, etc. Cloud computing systems often make use of different types of virtual services (e.g., computing containers, virtual machines) that provide storage and computing functionality to various clients and customers. These virtual services can be hosted by respective server nodes on a cloud computing system.

As demand for cloud computing resources continues to grow, and as the demographic of cloud computing users has become more decentralized, additional innovations are needed to meet this change in demand. For example, conventional cloud computing systems have experienced significant costs and challenges in scaling centrally maintained cloud computing datacenters to accommodate a growing user-base. In addition, users may often experience latency issues and demand more speed than can be provided by a remote cloud computing system. Moreover, many individuals and businesses prefer greater control and/or security of cloud computing resources over conventional models in which cloud computing resources are shared between multiple tenants.

In an attempt to overcome various drawbacks and/or shortcomings of conventional cloud computing systems, many customers have expressed a desire to have local edge networks (e.g., computing zones) that provide faster access to cloud computing resources. Implementation of these local computing zones, however, poses a number of difficulties and challenges. For example, where devices of an edge network may logically connect with various devices on the cloud, these connections between edge and cloud often provide limited bandwidth. This limited bandwidth can cause significant delays in communication of data between the edge and cloud. Moreover, attempting to transfer large files in this way can affect other traffic being communicated between devices of the cloud computing system. As a result, performance of edge networks may suffer during periods of high demand, often negating many of the benefits of lower latency that a local computing zone might provide.

These and other problems exist with regard to implementing cloud computing resources on local networks.

DETAILED DESCRIPTION

Figure 1:
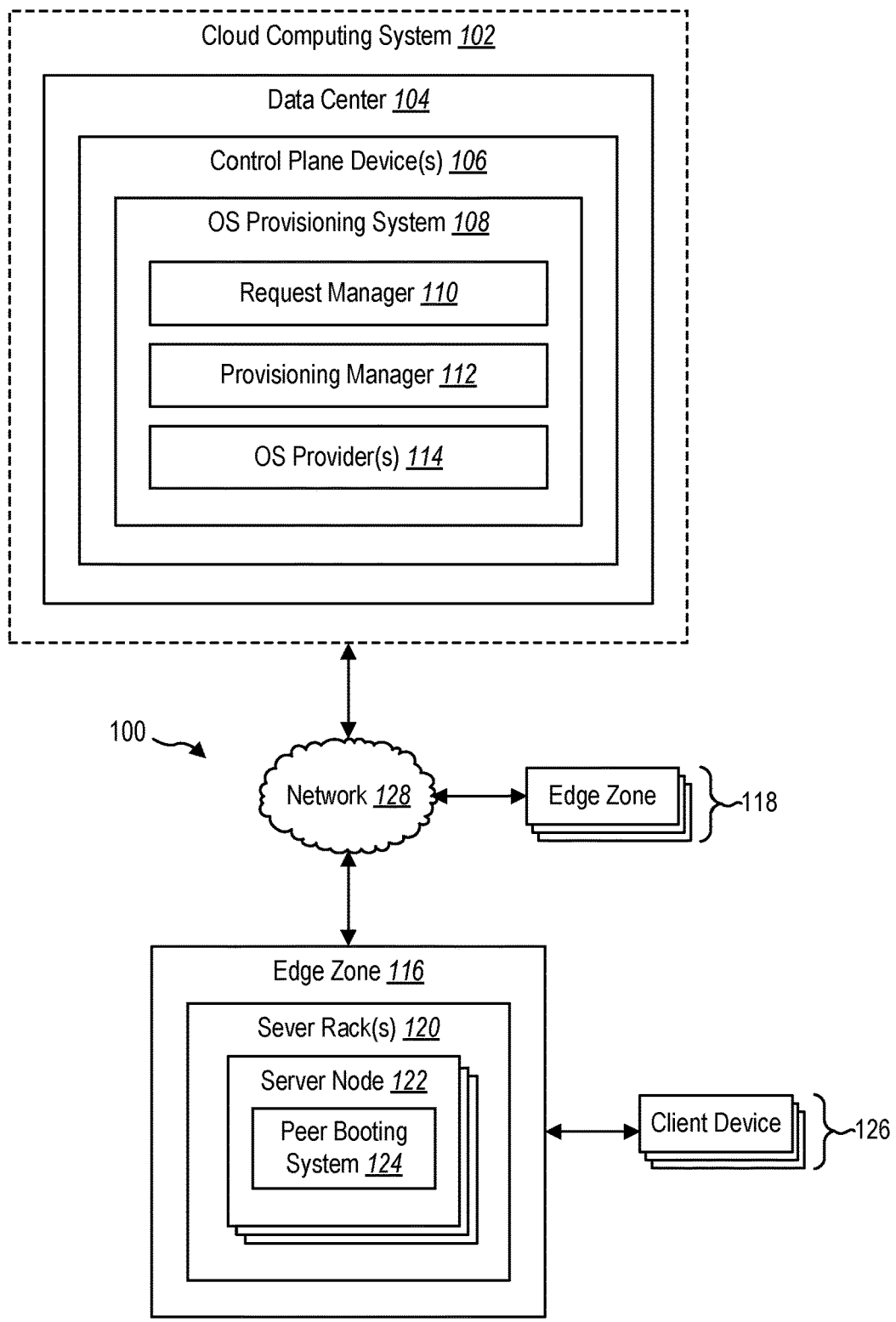
FIG. 1 illustrates an example environment including a peer booting system implemented on an edge zone in accordance with one or more embodiments.

The present disclosure is generally related to systems and methods for peer booting server nodes on an edge zone. For example, an edge zone (or edge network) may include server nodes configured to host virtual machines thereon that provide low-latency access to various cloud-computing services to customers of a cloud computing system. As will be discussed in further detail below, these server nodes may implement a peer booting system in which a server node at a location of an edge network obtains an operating system (OS) file (e.g., an OS boot file) and instantiates an operating system including features and functionalities of an OS provider service. A peer booting system implemented on the server node may then act as an OS provider for other server nodes on the edge zone. As will be discussed below, providing this functionality to other server nodes significantly increases the speed with which operating systems are booted on the server nodes while preventing server nodes on the network from overutilizing limited bandwidth resources.

As an illustrative example, an OS provisioning system implemented on one or more control planes may receive a boot request from a server node at a location of an edge zone. The OS provisioning system can generate a boot response including an identifier of the server node and information associated with an OS provider service on the set of control planes. In one or more embodiments, the OS provisioning system causes the OS provider service to provide an OS file to the server node causing the server node to instantiate an OS instance (e.g., a maintenance OS and/or a full OS) on the server node. In one or more implementations, the OS instance provides OS provider service functionality to the server node that may be used to provide OS files to other server nodes on the edge zone. For example, in one or more embodiments, the OS provisioning system may receive a second boot request from another server node on the edge zone. The OS provisioning system can provide a boot response including instructions associated with locally obtaining the OS file from the server node having the OS previously instantiated thereon. Indeed, the first server node may act as an OS provider service for any number of server nodes on the edge zone.

As will be discussed in further detail below, the present disclosure includes a number of practical applications having features described herein that provide benefits and/or solve problems associated with booting operating systems on server nodes of an edge zone. Some example benefits are discussed herein in connection with various features and functionality of the OS provisioning system as well as a peer booting system on a server node of the edge zone. Nevertheless, it will be understood that benefits explicitly discussed in connection with one or more implementations are provided by way of example and are not intended to be a comprehensive list of all possible benefits of the systems described herein.

For example, by loading a peer booting system on one or more server nodes on an edge zone, the systems described herein significantly reduce an amount of time that it takes to boot devices of an edge zone. Indeed, by providing functionality of the OS provider system on a local server node at the same location as other server nodes of the edge zone, a majority of server nodes on the edge zone can leverage local network speeds that are significantly faster than communicating with devices remotely located on a datacenter. In many cases, the server nodes may utilize wired connections (e.g., optical fiber) between respective devices rather than utilizing a much slower virtual private network (VPN) tunnel that connects data plane devices at the location of the edge zone to control plane devices on the datacenter of the cloud computing system.

In addition to faster boot times, providing access to OS boot files and other types of larger data files (e.g., image files) via a local connection between server nodes on the same edge zone provides a more reliable communication of data between devices. For example, where multiple server nodes may attempt to download image files or other large data files using a trivial file transfer protocol (TFTP), fulfilling these data requests will likely chock the VPN tunnel and result in some or all of the data transfers to fail. Alternatively, providing a local resource with limited functionality of one or more of the control plane devices can provide faster access without chocking the VPN tunnel and causing transfer of data to fail.

Moreover, by avoiding overuse of bandwidth resources to communicate OS boot files and other types of large data files, the bandwidth resources may continue to be used by server nodes of the edge network in other less demanding ways. Indeed, where the server nodes will still use various control plane services that are not located at the edge zone location, having this extra bandwidth will ensure that other requests and responses between the data plane devices and control plane devices will be communicated quickly and reliably between the server nodes of the edge zone and control planes on the datacenter.

As will be discussed in further detail below, implementing the systems and methods as described herein facilitate each of the above benefits without requiring that control plane devices be distributed to edge locations. Indeed, where control planes often provide valuable services to multiple edge locations, implementing peer booting systems on edge zone devices as disclosed herein provides limited local access to OS provider services within the framework of the edge zone without risking security of the cloud computing system. Moreover, this local OS provider functionality is accomplished without increasing management costs that would accompany distribution of control plane devices to every edge zone location.

As illustrated in the foregoing discussion, the present disclosure utilizes a variety of terms to describe features and advantages of the systems described herein. Additional detail is now provided regarding the meaning of some of these terms. For example, as used herein, a "cloud computing system" refers to a network of connected computing devices that provide various services to computing devices (e.g., customer devices). For instance, as mentioned above, a distributed computing system can include a collection of physical server devices (e.g., server nodes) organized in a hierarchical structure including clusters, computing zones, virtual local area networks (VLANs), racks, fault domains, etc. In one or more embodiments, the server devices may be implemented within a datacenter (e.g., a regional datacenter) including any number of server devices connected via an internal network of the datacenter and which provides any number of cloud computing services to clients of the cloud computing system. In one or more embodiments described herein, a cloud computing system includes a combination of multiple datacenters in addition to one or more edge zones extending computational resources of the cloud computing system beyond those provided exclusively within the datacenter(s).

In one or more embodiments described herein, a cloud computing system may include one or more edge zones. As used herein, an "edge zone" or "edge network" may refer interchangeably to an extension of the cloud computing system located on a periphery of the cloud computing infrastructure. The edge zone may refer to a hierarchy of one or more devices that provide connectivity to the cloud computing system to one or more clients connected to or on the same communication network as the edge zone. The edge zone may provide a number of cloud computing services on local hardware without requiring that a client communicate with components internal to a cloud computing system and without sharing resources with other tenants of the cloud computing system. In one or more embodiments, the edge zone provides a virtual access point that enables more direct communication with one or more components on the cloud computing system than another entry point, such as a public entry point, to the cloud computing system. In one or more embodiments described herein, a device (e.g., a server node) on an edge zone may refer to a device at a location associated with devices that make up the edge zone (or simply "an edge location").

In one or more embodiments described herein, the edge zone is associated with a specific datacenter (e.g., a regional datacenter) based on a location of the edge zone within an external network or physical proximity of the edge zone relative to the datacenter. This regional datacenter can serve as a parent for the edge zone and may be selected for a corresponding edge zone based on a low latency the regional datacenter provides to the edge zone as well as the data sovereignty the datacenter ensures within the geography. In one or more embodiments, the edge zone includes a combination of cloud computing hardware provided by and configured to operate in connection with the cloud computing system in combination with additional hardware that is separate from or otherwise independent from the cloud computing system. For example, in one or more embodiments, a server rack may refer to server nodes that are configured to operate in connection within the hierarchy of a cloud computing system and physically installed within an external network including one or more server devices that are not in communication with or otherwise configured to communicate internally with components of the cloud computing system.

As will be discussed in further detail below, server nodes of an edge zone may instantiate an operating system (OS) thereon that provides features and functionality to the server node. In addition, different examples may refer to a maintenance OS and a full OS. As used herein, a "maintenance OS" may refer to a pre-provisioning system or a pre-installation environment that enables the server node to run limited diagnostics for the machine and determine whether the server node is healthy within the framework of the network environment (e.g., including one or both of the edge zone and cloud computing system). As used herein, a "full OS" may refer to a fully operational system or environment in which the server node is ready or otherwise configured to host cloud-based applications and services, such as virtual machines and other computing containers.

In one or more embodiments, the various environments may include data planes and control planes. As used herein, a data plane or data plane device may refer to a machine or host node configured to host cloud-based services thereon.

For example, a data plane device may refer to a server node on a server rack having one or more hypervisors thereon that are capable of hosting virtual machines. In one or more examples described herein, a data plane device refers specifically to server nodes that are located on and implemented within a framework of the edge zone. A control plane device may refer to one or more server nodes on a datacenter having features and functionalities associated with managing resources on data plane devices. For example, a control plane device may receive requests for deployment or allocation of cloud computing resources and make determinations associated with which edge zone(s) and even which hypervisor should be tasked with managing deployment of various cloud computing services. Other example control plane features and functionality are discussed herein in connection with control planes on an OS provisioning system.

In one or more examples described herein, one or more control planes devices are located exclusively at a datacenter remote from a location of an edge zone. For example, in one or more implementations, an edge zone may be restricted from hosting one or more services on control planes, such as a service for providing a boot response. For instance, in one or more embodiments, an edge zone may be restricted from providing dynamic host configuration protocol (DHCP) services on a control plane at a location of the edge zone. Thus, in one or more embodiments, the edge zone would be unable to locally provide DHCP responses in providing additional security and data management, such as implementing firewall rules in a network of the control plane.

Additional detail will now be provided regarding systems mentioned above in relation to illustrative figures portraying example implementations. For example, FIG. 1 illustrates an example environment 100 showing a cloud computing system 102 including a datacenter 104 and a plurality of edge zones 116, 118. As shown in FIG. 1, the datacenter 104 includes one or more control plane device(s) 106 (e.g., a control plane system) having components of the operating system (OS) provisioning system 108 implemented thereon. As will be discussed in further below, the OS provisioning system 108 may include a request manager 110, a provisioning manager 112, and one or more OS provider(s) 114. The request manager 110, provisioning manager 112, and OS provider(s) 114 may be implemented on a control plane system, which may include one or more control plane devices on a datacenter 104.

The cloud computing system 102 may include any number of datacenters (e.g., regional datacenters) spaced across multiple geographic locations. Further, the datacenter 104 (and other datacenters) may include any number of server devices configured to provide features and functionalities of the cloud computing system 102 to any number of client devices (e.g., client devices 126). In addition, while FIG. 1 illustrates a cloud computing system 102 as inclusive of the datacenter 104, in one or more embodiments, the cloud computing system 102 may refer to the datacenter 104 in addition to devices of a plurality of edge zones (discussed below).

As mentioned above, the OS provisioning system 108 may include a number of components 110-114 implemented on one or more control plane devices 106. For example, in one or more embodiments, the OS provisioning system 108 includes a request manager 110 for handling a variety of requests. In one or more embodiments described herein, the request manager 110 is implemented on a control plane(s) configured to receive requests for boot files. For instance, as will be discussed below, the request manager 110 may refer to a dynamic host configuration protocol (DHCP) server configured to receive DHCP requests including a request for a boot file. The request manager 110 may process and provide the request to the provisioning manager 112 and/or OS provider(s) 114 for further processing.

As further shown in FIG. 1, the OS provisioning system 108 may include a provisioning manager 112. Similar to the request manager 110, the provisioning manager 112 may be implemented on a control plane device and configured to handle registration of an OS provider and provide information associated with a location of the OS provider to one or more server nodes on an edge zone. For example, in one or more embodiments, the provisioning manager 112 may provide an identifier of the OS provider(s) 114 to a first server node that provides a DHCP request to the request manager 110. In addition, upon receiving subsequent requests from other server nodes, the provisioning manager 112 can provide instructions to the server nodes to enable server nodes on the edge zone to connect with one another and communicate boot files over a local network rather than via a VPN tunnel.

As further shown in FIG. 1, the OS provisioning system 108 includes one or more OS provider(s) 114. Similar to other components 110-112 on the OS provisioning system 108, the OS provider(s) 114 may be implemented on one or more control plane device(s) 106 of the cloud computing system 102. As will be discussed in further detail below, the OS provider(s) 114 can provide access to one or more boot files server node(s) on an edge zone. For example, the OS provider(s) 114 can provide an OS file for instantiation on the server node(s) of the edge zone. The OS provider(s) 114 may additionally provide one or both of a maintenance OS file or a full OS file. As will be discussed in further detail below, providing the OS file(s) to the server nodes may involve providing functionalities of the OS provider(s) 114 to the respective server nodes such that the server node(s) can act as OS provider(s) for other server nodes on the edge zone.

As mentioned above, and as shown in FIG. 1, the environment 100 shows a number of edge zones 116, 118. Additional detail will be discussed in connection with an example edge zone 116 associated with a first location, which may include similar features as any of the additional edge zones 118 associated with other locations. As shown in FIG. 1, the edge zone 116 includes one or more server rack(s) 120, which may include any number of server nodes 122. Each of the server nodes 122 may refer to data plane devices, which may include virtual machines deployed thereon.

As shown in FIG. 1, the server nodes 122 may include a peer booting system 124. As will be discussed in further detail below, the peer booting system 124 can facilitate instantiation of an operating system thereon (e.g., a maintenance operating system and a full operating system). Once the operating system is booted on a particular server device, the peer booting system 124 may act as an OS provider to one or more additional server devices on the edge zone 116. For example, once the operating system is up and running on a first server node, the peer booting system 124 may receive an identification of one or more boot requests from other server nodes and initiate communication of one or more OS boot file(s) to other server nodes via a wired or wireless network local to the edge zone 116.

As shown in FIG. 1, a set of client devices 126 may communicate with and access services of the cloud computing system 102 via the edge zone 116. In particular, the client devices 126 may provide requests for deployment of virtual machines and other cloud-based services to be hosted on the edge zone 116 and/or on the datacenter 104. The client devices 126 may refer to various types of computing devices including, by way of example, mobile devices, desktop computers, server devices, or other types of computing devices.

As further shown in FIG. 1, devices of the edge zone 116 may communicate with components of the cloud computing system 102 via a network 128. The network 128 may include one or multiple networks that use one or more communication platforms or technologies for transmitting data. For example, the network 128 may include the Internet or other data link that enables transport of electronic data between respective client devices 126 and devices of the cloud computing system 102 and/or edge zone 116. In some cases, network 128 includes a virtual private network (VPN) (e.g., a VPN tunnel) and/or a virtual extensible local area network (VXLAN) network connection built on top of the customer network to link the edge zone 116 to the cloud computing system 102.

As noted above, and as shown in FIG. 1, the environment 100 may include additional edge zones 118 corresponding to different locations and/or different clients/customers. Each of the edge zones 118 may include similar features and functionality discussed in connection with the edge zone 116 (and other edge zones discussed herein). The datacenter 104 may be associated with any number of edge zones having similar or different combinations of server nodes on respective server racks (e.g., in accordance with received hardware requests indicating different virtual machine types and/or computing requirements).

Additional information will now be discussed in connection with an example implementation of the OS provisioning system 108 and managing instantiation of OS instances on server nodes of an edge zone. In particular, FIG. 2 illustrates an example environment 200 including an OS provisioning system 108 and an edge zone 202 having similar features and functionalities as the edge zones 116, 118 discussed above in connection with FIG. 1.

Figure 2:
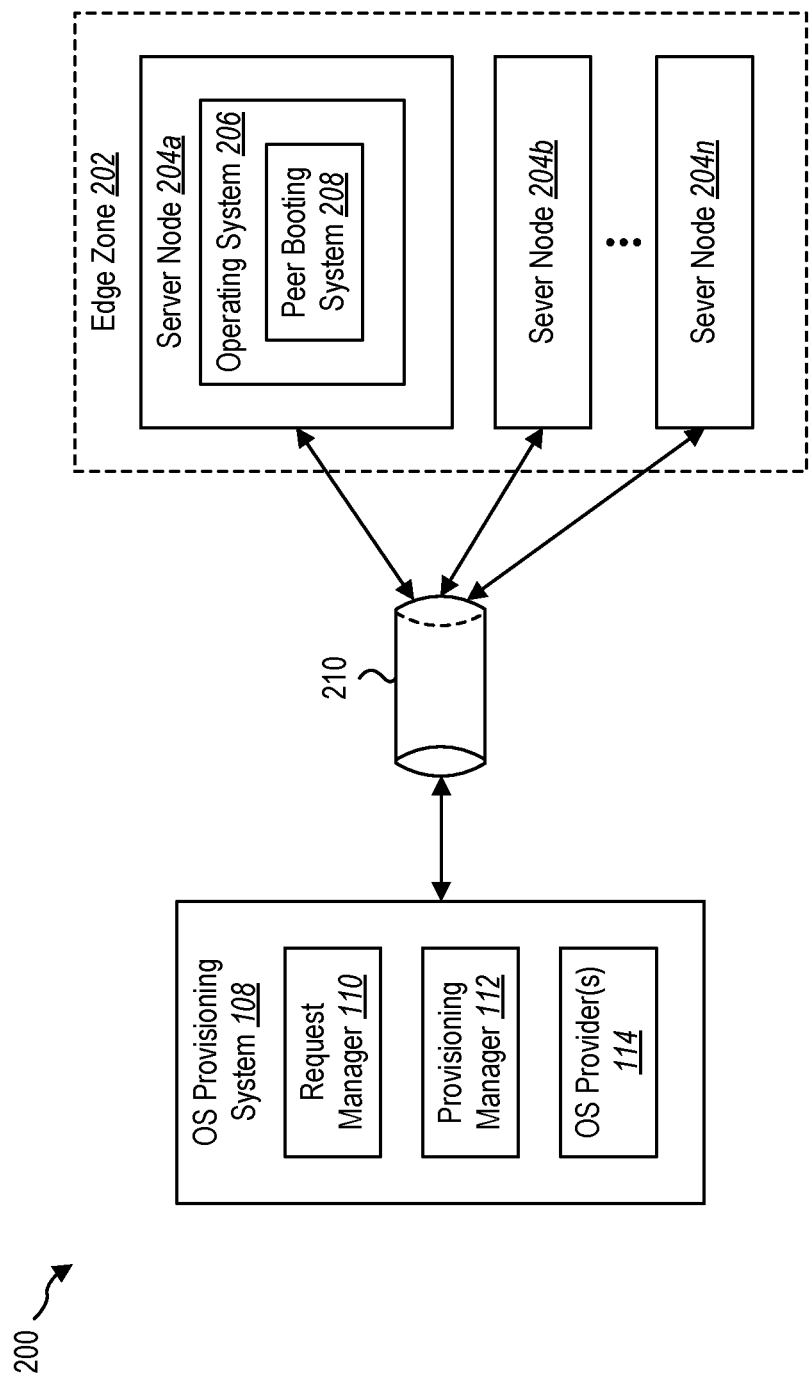
FIG. 2 illustrates another example environment showing an operating system (OS) providing system and a peer booting system in accordance with one or more embodiments.

For example, as shown in FIG. 2, the example environment 200 includes an OS provisioning system 108 including a request manager 110, provisioning manager 112, and OS provider(s) 114 having similar features as similar components discussed above in connection with FIG. 1. As further shown, the environment 200 includes an edge zone 202 having a plurality of server nodes 204a-n. One or more of the server nodes 204a-n may have operating systems. For example, a first server node 204a may have an operating system 206 (e.g., a full operating system) instantiated and running thereon, which may include a peer booting system 208 having similar features as the peer booting system 124 mentioned above in connection with FIG. 1.

As will be discussed in further detail below, the peer booting system 208 may provide one or more features and functionalities as the OS provider(s) 114 to other server nodes 204b-n of the edge zone 202. For example, as will be discussed below in connection with FIG. 3, the first server device 204a may provide a boot request to the OS provisioning system 108 that facilitates receiving a boot file and instantiating the operating system 206 on the first server node 204a. Once instantiated, the first server node 204a may act as a source of boot files for the second server node 204b and any additional server nodes on the edge zone 202.

As further shown in FIG. 2, the OS provisioning system 108 and devices of the edge zone 202 may communicate via a VPN tunnel 210. In accordance with one or more embodiments described herein, the devices of the edge zone 202 and the OS provisioning system 108 may communicate data and files via the VPN tunnel 210 using TFTP. In one or more embodiments, the server nodes 204a-n may communicate requests via the VPN tunnel 210 using DHCP requests. In one or more embodiments, the server nodes 204a-n may communicate outside the established communication path of the VPN tunnel 210 by providing a hypertext transfer protocol (HTTP) request to one or more server devices on the cloud computing system 102.

Figure 3:
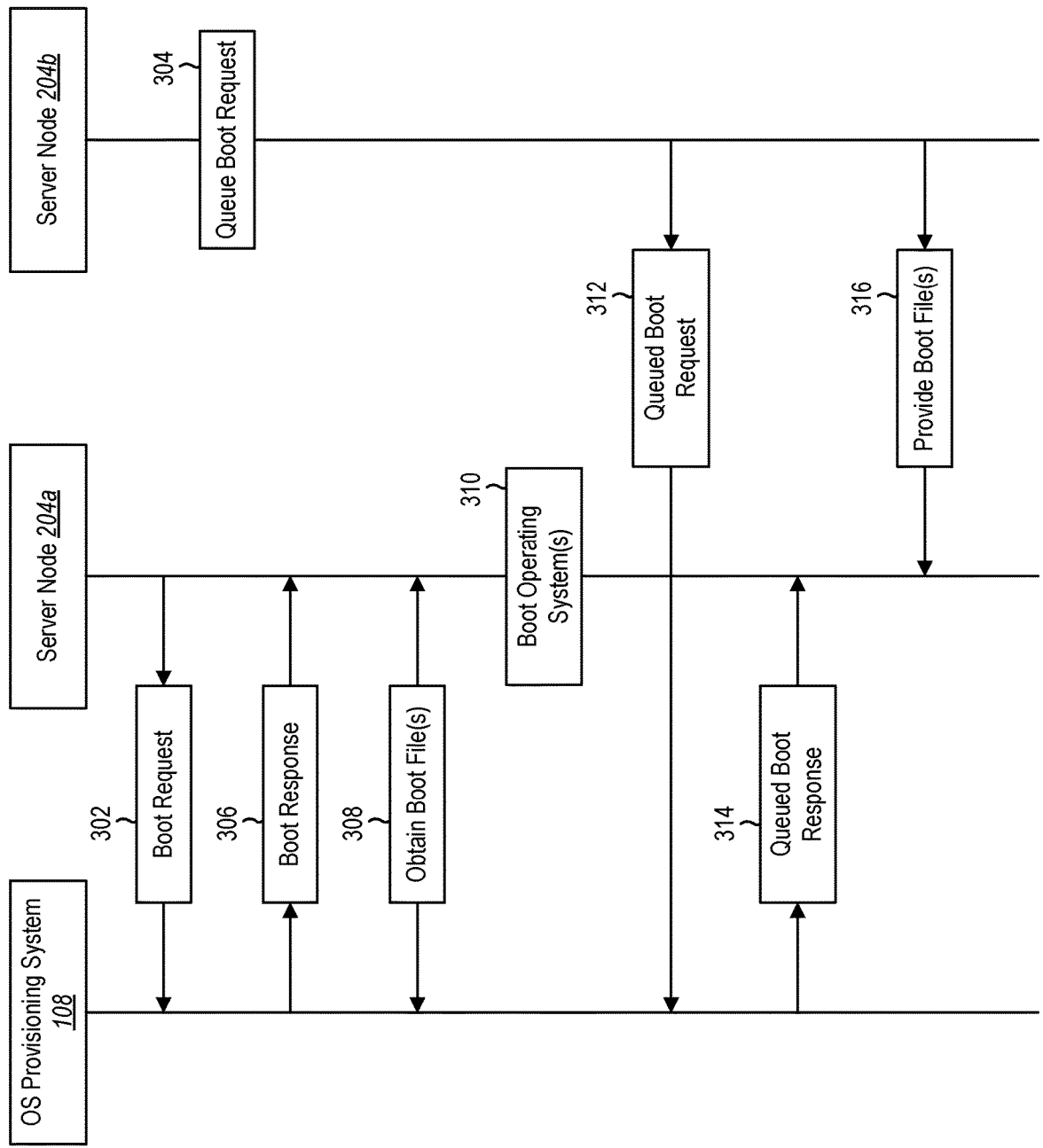
FIG. 3 illustrates an example series of communications between devices of a control plane system and server nodes on an edge zone in accordance with one or more embodiments.

An example implementation of the components shown in FIG. 2 is discussed in connection with a series of interactions shown in FIG. 3. In particular, FIG. 3 shows a series of interactions between the OS provisioning system 108 and a set of server nodes 204a-b including a first server node 204a and a second server node 204b. As noted above, the server nodes 204a-b may refer to data plane devices implemented on a server rack at an edge location.

As further mentioned above, the OS provisioning system 108 may be implemented across one or more control plane devices of a control plane system. For example, while not explicitly shown in FIG. 3, individual components 110-114 may be implemented on respective control plane devices of a datacenter. For instance, the request manager may be implemented on a first control plane(s). The provisioning manager 112 may be implemented on a second control plane(s). The OS provider(s) 114 may be implemented on a third control plane(s). Each of the components 110-114 may be implemented on a single or across multiple control plane devices. As an illustrative example, the OS provider(s) 114 may include a first OS provider associated with providing boot files for a maintenance OS and a second OS provider associated with providing boot files for a full OS. Thus, while FIG. 3 describes interactions between the OS provisioning system 108 and server nodes 204a-b, one or more embodiments may involve communications between respective components 110-114 on a control plane system, as will be discussed in further detail in connection with FIGS. 4A-4C.

As shown in FIG. 3, the OS provisioning system 108 and server nodes 204a-b may cooperatively cause an OS instance to be instantiated on the server nodes 204a-b to enable one or both of the server nodes 204a-b to act as an OS provider to one or more additional server nodes on an edge zone (e.g., edge zone 202). In particular, a first server node 204a may perform an act 302 of providing a boot request to the OS provisioning system 108. In one or more embodiments, the boot request is a dynamic host configuration protocol (DHCP) request provided to a request manager 110 (e.g., a DHCP server) on one of a set of control plane devices. In one or more embodiments, the boot request is communicated via the VPN tunnel 210 logically connecting the server nodes 204a-n and various components of the OS provisioning system 108.

The boot request may include various information provided to the OS provisioning system 108. For instance, the boot request may include an indication of action executable by a control plane device on the OS provisioning system. In this example, the boot request may include an identifier for the first server node 204a and/or edge zone as well as information associated with an operating system that the server node 204a wants to instantiate or otherwise boot up. In one or more embodiments, the boot request includes information about specifications of the server node 204a and any other instructions that may be used by components of the OS provisioning system 108 is responding to the boot request.

Concurrent with or subsequent to the first server node 204a generating and providing the boot request to the OS provisioning system 108, a second server node 204b may perform an act 304 of queuing a boot request. As an example, where an edge zone includes multiple server nodes that are attempting to boot or requesting image files, it may occur where multiple server nodes attempt to generate and provide boot requests to the OS provisioning system 108. In this example, the second server node 204b or other component on a server rack (e.g., a rack manager, a rack switch) may recognize that a boot request has been provided by the first server node 204a and cause the boot request to be queued for the second server node 204b.

In one or more embodiments, the OS provisioning system 108 may queue the boot request and proceed in processing the boot request from the first server node 204a prior to performing any further processing of the boot request from the second server node 204b. For example, in one or more embodiments, while the OS provisioning system 108 is processing a boot request received from a first server node 204a, the OS provisioning system 108 may wait an additional period of time before processing a second boot request from the second server node. This period of waiting may enable the OS provisioning system 108 to fully process the boot request and instantiate the OS instance on the first server node 204a. Further, this waiting period may prevent a flood of incoming boot requests from overloading available bandwidth of a VPN tunnel.

Thus, in accordance with one or more embodiments described herein, the OS provisioning system 108 can process a boot request from a second server node 204b in a variety of circumstances. For example, the OS provisioning system 108 can process a second boot request after servicing a first boot request based on a timeout period providing adequate time for the first boot request to be processed. As another example, the OS provisioning system 108 can process a second boot request based on a notification or registration of an OS provider instance at the edge location. In one or more embodiments, the OS provisioning system 108 can process a second boot request after verifying that an OS provider instance is already available at the edge location (e.g., an OS provider instance previously instantiated prior to receiving the second boot request).

As shown in FIG. 3, in response to the boot request, the OS provisioning system 108 can perform an act 306 of generating and providing a boot response to the first server node 206a. The boot response may include an identifier of the first node and information associated with an OS provider service on the OS provisioning system 108 configured to provide an OS file to the first server node 204a. For example, in one or more embodiments, the boot response includes an IP address for an OS provider 114 that enables the first server node 204a to obtain access to an OS file. In one or more embodiments, the boot response further includes an IP address for a provisioning manager 112.

The server node 204a may additionally perform an act 308 of obtaining boot file(s) 308 from the OS provisioning system 108. For example, the server node 204a may download or otherwise receive an OS file via the VPN tunnel connecting the edge zone 202 and the OS provisioning system 108. As will be discussed in further detail below, the server node 204a may receive one or both of a maintenance OS and a full OS for instantiation on the server node 204a. For example, in one or more embodiments, the server node 204a first receives and instantiates a maintenance OS on the server node 204a. After performing one or more verifications of machine health and other diagnostics, the server node 204a may additionally obtain a full OS file from the OS provider(s) of the OS provisioning system 108.

As shown in FIG. 3, providing the bot file(s) to the server node 204a may cause the server node to perform an act 310 of booting an operating system thereon. For example, as noted above, the server node 204a may boot a maintenance OS and a full OS on the server node 204a to have full functionality within a framework of the edge zone 202 and cloud computing system 102. In one or more embodiments, booting the operating system includes implementing a peer booting system 208 thereon that has some or all of the same features as the OS provider(s) 114 on the OS provisioning system 108. Indeed, in one or more embodiments, the peer booting system 208 includes an image of the OS provider(s) 114 locally installed on the server node 204a that provide one or more of the services provided by the OS provider(s) 114 to any of the additional server nodes on the edge zone 202.

After the server node 204a is fully operational, the OS provisioning system 108 may perform an act 312 of receiving the queued boot request from the second server node 204b. In one or more embodiments, the second server node 204b provides the queued boot request based on receiving a signal that the first server node 204a is operational and has the full OS instantiated thereon. Alternatively, in one or more embodiments, the OS provisioning system 108 begins processing the boot request previously received from the second server node 204b while the OS provisioning system 108 was handling the first boot request from the first server node 204a.

Similar to the first boot request, the second boot request may similarly include information about the second server node 204b including an IP address of the server node 204b and/or edge zone 202. As shown in FIG. 3, in response to receiving the queued boot request, the OS provisioning system 108 can perform an act 314 of generating a queued boot response. In one or more embodiments, the queued boot response is generated and provided to the server node 204a. For example, based on identifying information contained within the boot request, the OS provisioning system 108 may determine that one or more server nodes (e.g., the first server node 204a) has a fully operational OS implemented thereon and is capable of providing OS boot files to other server nodes on the edge zone 202.

As shown in FIG. 3, for example, in response to receiving the queued boot response, the first server node 204a may perform an act 316 of providing or otherwise communicating boot files to the second server node 204b. In one or more embodiments, the first server node 204a provides one or more boot files using a similar process as used when the OS provisioning system 108 provided one or more boot files to the first server node 204a. One notable difference between the two different distributions of the server nodes may include the network and/or communication medium over which the boot files are provided. For example, rather than communicating the boot files to the second server node 204b over the VPN tunnel, the first server node 204a may provide the boot files to the second server node 204b via a local network, which may include a wired communication medium between the server nodes 204a-b. In one or more embodiments, the first server node 204a provides the boot file(s) to the second server node 204b via an optical fiber connection between the respective devices, thus resulting in a significant boost in speed with which the OS is instantiated on the second server node 204b.

The first server node 204a may perform a similar process of providing boot files to other server nodes on the edge zone 202 in response to boot requests provided by other server nodes to the OS provisioning system 108. Moreover, in one or more embodiments, the second server node 204b may additionally implement a peer booting system thereon that enables the second server node 204b to similarly function as a peer booting device to any of the other server nodes on the edge zone 202. This may be particularly useful where some or all of the server nodes on a server rack or edge zone 202 are simultaneously (or near simultaneously) requesting boot files from the OS provisioning system 108.

Figure 4A:
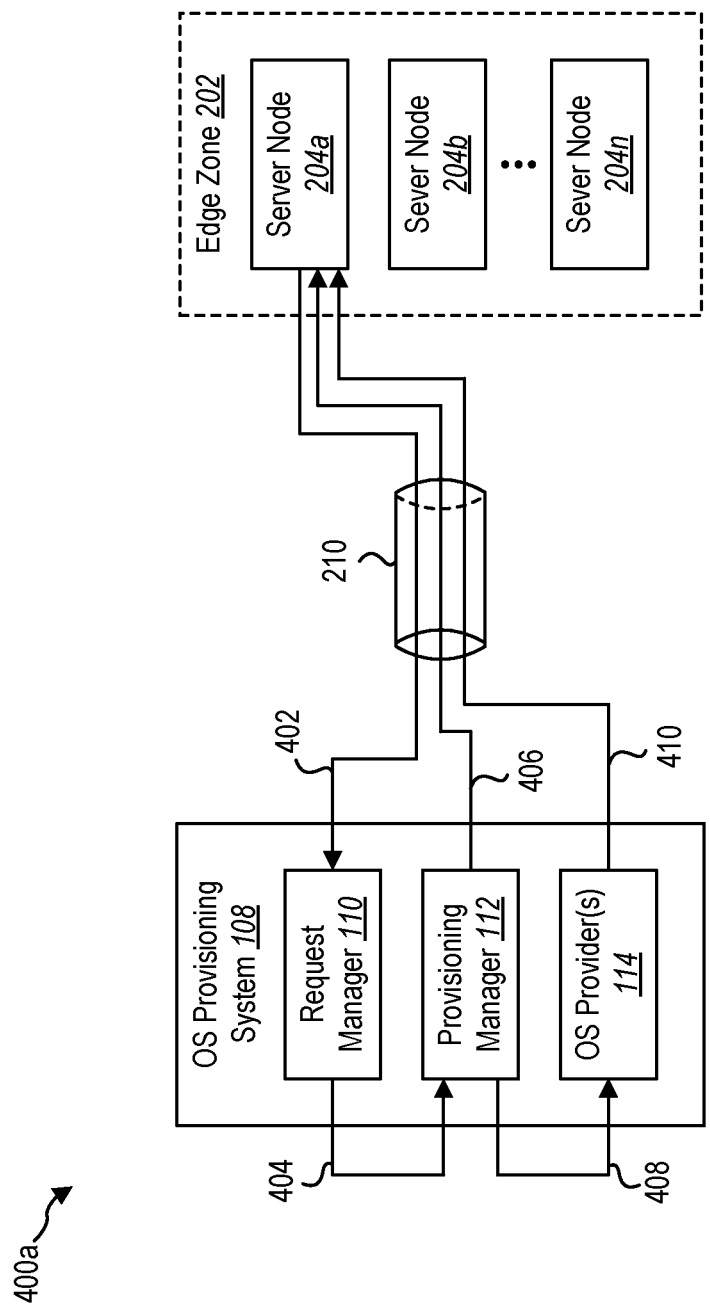
FIGS. 4A-4C illustrate an example implementation in which a server node on an edge zone facilitates peer booting of one or more OS images on additional server nodes of the edge zone in accordance with one or more embodiments.
Figure 4B:
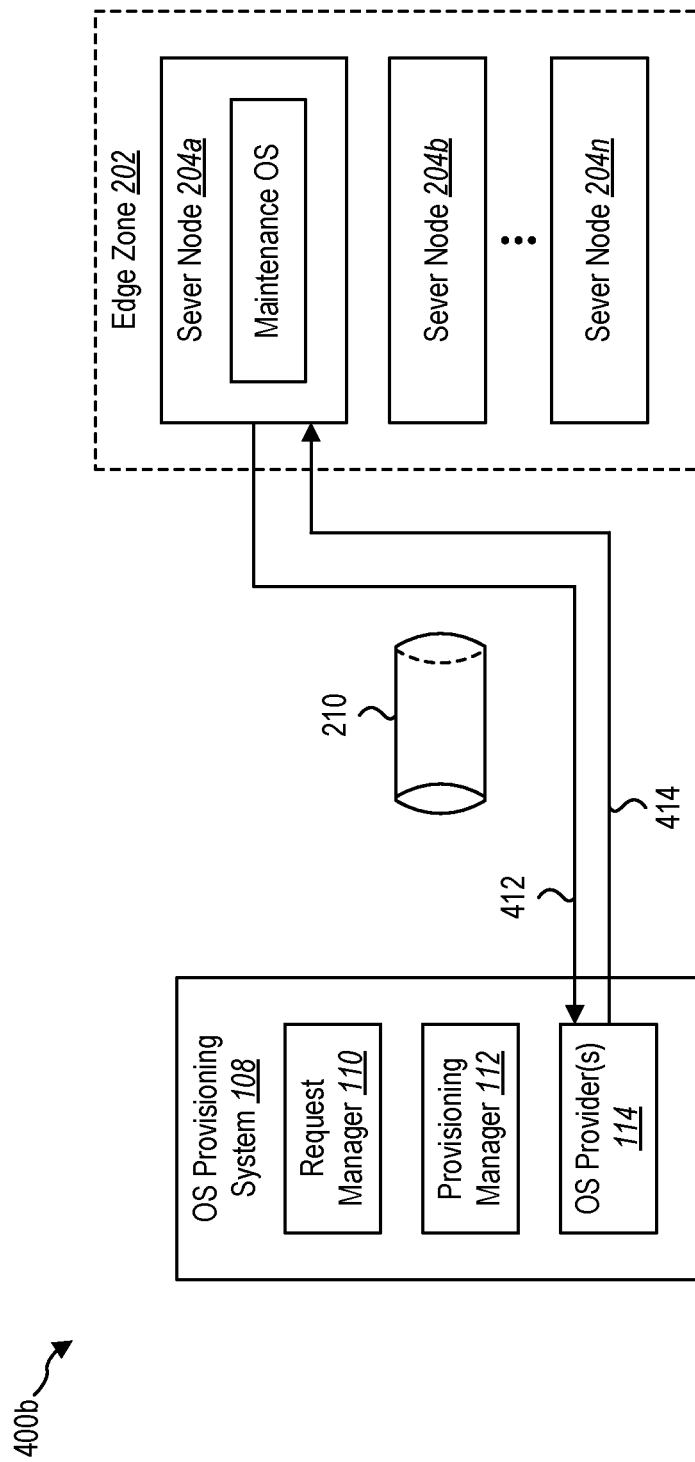
Figure 4C:
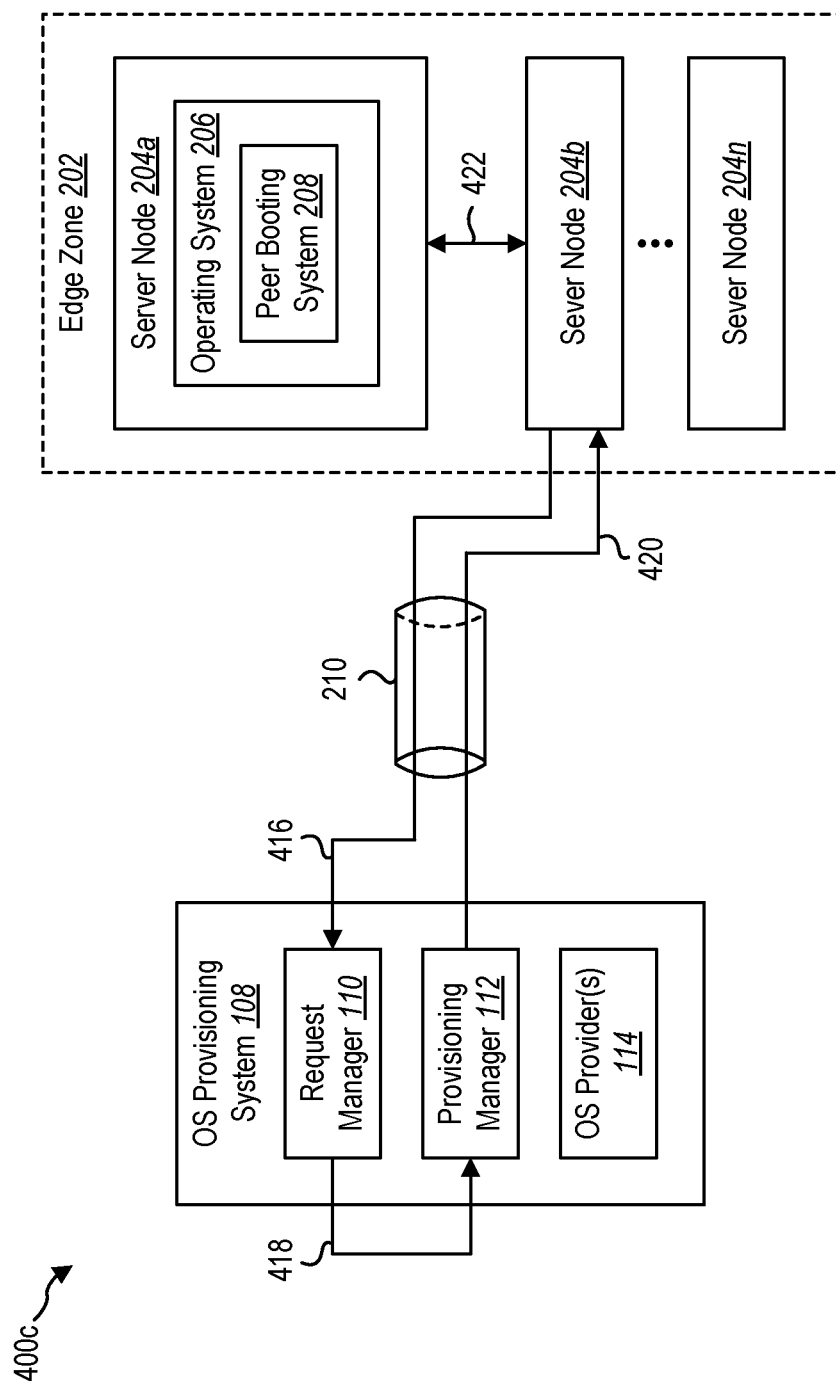

Additional information will now be discussed in connection with an example implementation within a similar environment as the environment discussed above in connection with FIG. 2. Indeed, FIGS. 4A-4C illustrate additional interactions that may occur in addition or in lieu of one or more of the interactions discussed above in connection with FIG. 3. More specifically, FIGS. 4A-4C illustrate an example implementation showing communications that may occur between respective server nodes and specific components of the OS provisioning system 108, which may refer to systems that are implemented on a system of control planes remotely maintained on a datacenter.

For example, FIG. 4A illustrates a first example environment 400a showing the OS provisioning system 108 having the request manager 110, provisioning manager 112, and OS provider(s) 114 thereon, which may be implemented on different control plane devices. As further shown, the edge zone 202 may include any number of server nodes 204a-n. In this example environment 400a, each of the server nodes 204a-n may refer to empty nodes having no operating systems instantiated thereon and prior to communicating any boot request to the OS provisioning system 108.

As shown in FIG. 4A, a first server node 204a may perform an act 402 of providing a first DHCP request to the request manager 110. In this example, the request manager 110 may refer to a DHCP server configured to handle DHCP requests from server devices across any number of edge zones 202. As noted above, the DHCP request may include an IP address or other identifier of the server node 204a as well as any information associated with the edge zone 202 that enables the DHCP server to handle the DHCP request.

As shown in FIG. 4A, the request manager 110 may handle the DHCP request by performing an act 404 of providing information associated with the server node 204a to a provisioning manager 112. In one or more embodiments, the request manager 110 relays the DHCP request based on verifying that the identifier for the first server node 204a corresponds to a server node from an approved edge zone. Where the server node does not correspond to a known or approved edge zone 202, the request manager 110 may reject the DHCP request.

Where the DHCP request is provided to the provisioning manager 112 (e.g., based on a successful validation of the edge zone 202), the provisioning manager 112 may perform one of a number of actions. For example, as shown in FIG. 4A, the provisioning manager 112 may perform an act 406 of providing a boot response to the server node 204a including an indication that the DHCP request has been successfully received and processed. In one or more embodiments, the boot response includes an identification of one or more OS provider(s) 114 that are capable of servicing a request for an OS boot file. For example, the boot response may include one or more IP addresses that provide access to one or more maintenance OS files and/or full OS files (e.g., OS boot files).

In addition to providing the boot response to the server node 204a, the provisioning manager 112 may perform an act 408 of providing information from the DHCP request to the OS provider(s) 114. For example, in one or more embodiments, the provisioning manager 112 provides an IP address and other relevant information to one or more OS provider(s) 114 identified within the boot response communicated to the server node 204a. In this way, the server node 204a may have information identifying one or more OS provider(s) 114 while the OS provider(s) 114 similarly has information identifying the server node 204a.

As shown in FIG. 4B, the OS provider(s) 114 may perform an act 410 of providing a maintenance OS file to the first server node 204a. In this example, the server node 204a and/or OS provider(s) 114 may initiate contact and cause the maintenance OS file to be downloaded or otherwise transferred from the OS provider(s) 114 to the server node 204a. As shown in FIG. 4A, the maintenance file may be provided via the VPN tunnel 210. In accordance with one or more embodiments described herein, the server node 204a may instantiate the maintenance OS thereon providing various testing and diagnostic functionalities to the server node 204a without providing full functionality of a full OS.

FIG. 4B illustrates an example environment 400b showing an example implementation in which the first server node 204a obtains a copy of a full OS file for instantiation on the server node 204a. It will be understood that FIG. 4B shows one or more subsequent acts that may be performed by the OS provisioning system 108 and the server node 204a after the acts 402-410 illustrated in FIG. 4A.

As shown in FIG. 4B, the first server node 204a may have a maintenance OS instantiated thereon. After performing one or more health checks and verifying functionality of the server node 204a within a framework of the edge zone 202 and/or cloud computing system 102, the first server node 204a may perform an act 412 of providing another boot request to the OS provisioning system 108. In particular, as shown in FIG. 4B, the server node 204a may provide a boot request directly to the OS provider(s) 114 based on previously received information indicating an identified of one or more OS provider(s) 114 capable of servicing an OS boot file request.

In this example, the first server node 204a provides a boot request specifically requesting access to a full OS boot file. Moreover, as shown in FIG. 4B, the server node 204a may provide the boot request using a different communication medium or protocol from the VPN tunnel. For instance, rather than sending another boot request to a DHCP server using DHCP, the first server node 204a may provide the boot request via hypertext transfer protocol (HTTP). The request may further be provided via an alternative network (e.g., a public network) having more bandwidth resources than the VPN tunnel 210.

As shown in FIG. 4B, in response to receiving the boot request, the OS provider(s) 114 can perform an act 414 of providing the OS file (e.g., the full OS file) to the first server node 204a. In one or more embodiments, the OS provider(s) 114 provides the OS file via a different network than the VPN tunnel 210 based on the boot request being provided via an HTTP request. Providing the OS file in this way based on the HTTP request enables the OS provider(s) 114 to provide a much larger full OS file (e.g., than the maintenance file) to the first server node 204a without using limited bandwidth of the VPN tunnel 210. In this way, the VPN tunnel 210 may be used for processing other requests including, by way of example, other DHCP requests that may be received from one or additional server nodes on the edge zone 202.

Upon receiving the full OS file, the first server node 204a may instantiate the full OS instance on the server node, which may include implementing a peer booting system 208. For example, FIG. 4C shows an example implementation in which the first server node 204a has loaded the full OS thereon and implemented the peer booting system 208 configured to provide some or all of the same features as the OS provider(s) 114 to other server nodes 204b-n on the edge zone 202.

FIG. 4C shows another example environment 400c in which the full operating system is instantiated on the first server node 204a having a peer booting system 208 implemented thereon. It will be understood that FIG. 4C shows one or more subsequent acts that may be performed by the OS provisioning system 108 and server nodes 204a-n after the acts 412-414 illustrated in FIG. 4B.

For example, as shown in FIG. 4C, a second server node 204b may perform an act 416 of providing a second DHCP request to the request manager 110 on the OS provisioning system 108. The second DHCP request may include similar information as the first DHCP request in connection with the second server node 204b. For example, the second DHCP request may include any information about the second server node 204b, such as an IP address for the second server node 204b. The DHCP request may additionally include information about the edge zone 202 that the request manager 110 may use to verify that the second server node 204b originated from the approved edge zone 202. In one or more embodiments, the request manager 110 identifies that the second DHCP request originates from a second server node 204b that shares a local network with the first server node 204a.

As shown in FIG. 4C, the request manager 110 may perform an act 418 of processing the DHCP request that involves providing information about the DHCP request to the provisioning manager 112. For example, upon verifying that the DHCP request originates from an approved edge zone 202, the request manager 110 may provide the second DHCP request (or information obtained from the DHCP request) to the provisioning manager 112 for further processing. In one or more embodiments, the request manager 110 provides additional instructions indicating that the second server node 204b corresponds to the first server node 204a having the operating system 206 (e.g., a full operating system) and peer booting system 208 thereon. Alternatively, in one or more embodiments, the provisioning manager 112 may make the determination that the server nodes 204a-b are on a common edge zone 202.

As shown in FIG. 4C, the provisioning manager 112 may perform an act 420 of providing a DHCP response to the second server node 204b. As shown in FIG. 4, the DHCP response may be provided directly to the second server node 204b via the VPN tunnel 210. In one or more embodiments, the DHCP response is provided to the second server node 204b upon verifying or otherwise determining that the second server node 204b is on the edge zone 202 and capable of receiving the OS file(s) from the first server node 204a.

As shown in FIG. 4C, the provisioning manager 112 may provide the DHCP response including an identification of the first server node 204a, which may be done in contrast to the first DHCP response in which an IP address for the OS provider(s) 114 on the OS provisioning system 108 were identified. Indeed, based on verifying that one or more server nodes on the edge zone 202 have a full operating system instantiated thereon, the provisioning manager 112 may provide IP addresses of one or more server nodes on the edge zone 202 having full operating systems without providing information about the OS provider(s) 114 as previously performed when a server node is the first of the edge zone 202 to provide the boot request(s). In this way, the OS provisioning system 108 can facilitate peer to peer booting on the edge zone 202 via a direct connection 422 (e.g., a wired connection, such as an optical fiber connection) in a way that does not utilize limited bandwidth resources of the VPN tunnel 210.

Figure 5:
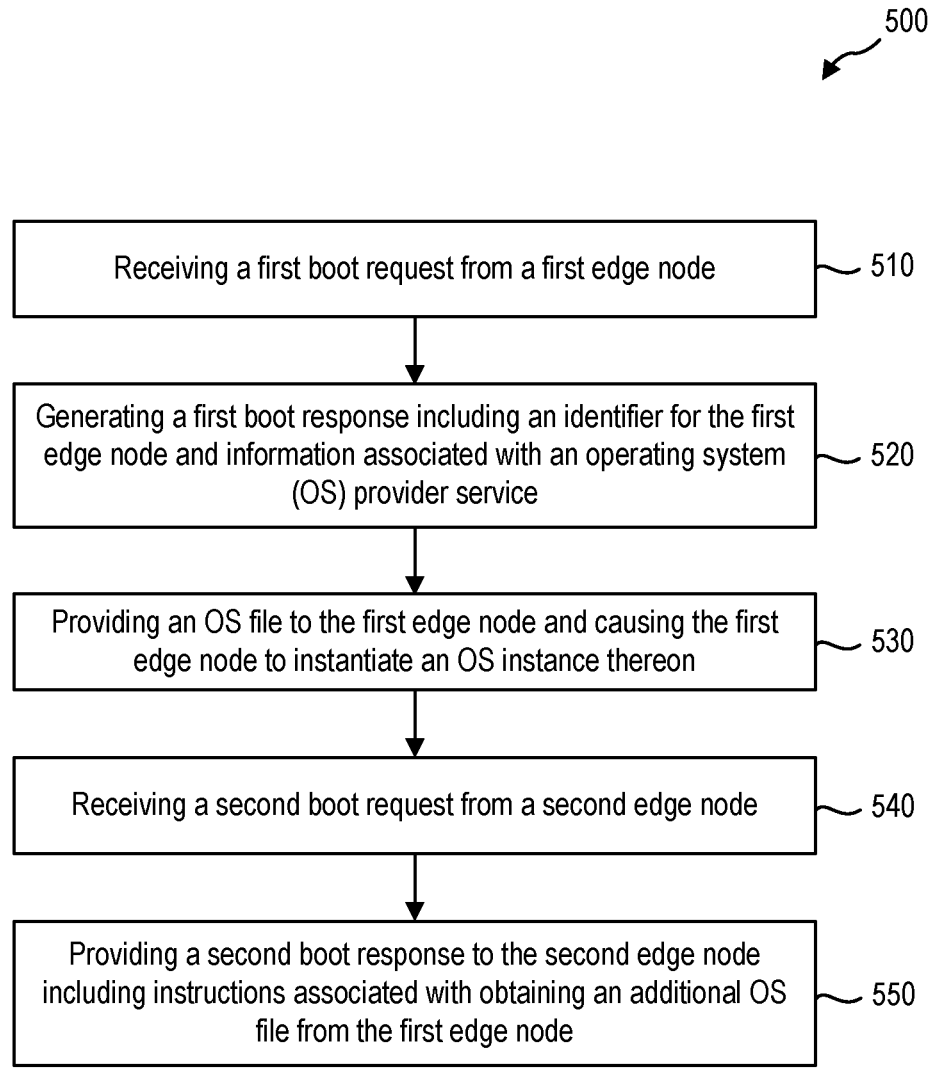
FIG. 5 illustrates an example series of acts for facilitating peer booting of server devices on an edge zone in accordance with one or more embodiments.

Turning now to FIG. 5, this figure illustrates an example flowchart including a series of acts related to instantiating an operating system on a server node of an edge zone as well as facilitating peer to peer provisioning of operating systems between server nodes of the edge zone. While FIG. 5 illustrate acts according to one or more embodiments, alternative embodiments may omit, add to, reorder, and/or modify any of the acts shown in FIG. 5. The act of FIG. 5 can be performed as part of a method. Alternatively, a non-transitory computer-readable medium can include instructions that, when executed by one or more processors, cause a computing device to perform the acts of FIG. 5. In still further embodiments, a system can perform the act of FIG. 5.

FIG. 5 shows a series of acts 500 for instantiating an operating system on a server node of an edge zone that can act as an OS provider(s) for one or more additional server nodes on the edge zone. For example, as shown in FIG. 5, the series of acts 500 may include an act 510 of receiving a first boot request from a first edge zone. In one or more embodiments, the act 510 includes receiving, at a control plane system, a first boot request from a first node at an edge location.

In one or more embodiments, the first boot request includes a dynamic host configuration protocol (DHCP) request provided to a DHCP server on the control plane system, and wherein the first boot request is communicated via a virtual private network (VPN) tunnel connecting a plurality of nodes at the edge location and the control plane system. Further in one or more embodiments, the DHCP server is located on a datacenter of a cloud computing system where the datacenter is located at a remote location from the edge location.

As further shown, the series of acts 500 includes an act 520 of generating a first boot response including an identifier for the first edge node (e.g., a server node) and information associated with an OS provider service. For example, in one or more embodiments, the act 520 includes generating, in response to the first boot request, a first boot response including an identifier for the first node and information associated with an operating system (OS) provider service on the control plane system.

In one or more embodiments, generating the first boot response includes providing the identifier for the first node to a control plane hosting the OS provider service thereon where the identifier for the first node includes an internet protocol (IP) address for the first node. Generating the first boot response may also include providing the information associated with the OS provider service to the first node, the information including an IP address for the control plane hosting the OS provider service and instructions associated with obtaining the OS file from the OS provider service.

As further shown, the series of acts 500 may include an act 530 of providing an OS file to the first edge node and causing the first edge node to instantiate an OS instance thereon. For example, in one or more embodiments, the act 530 includes causing the OS provider service to provide an OS file to the first node, wherein providing the OS file to the first node causes the first node to instantiate an OS instance on the first node where the OS instance provides a local instance of the OS provider service on the first node.

In one or more embodiments, causing the OS provider server to provide the OS file to the first node includes providing a maintenance OS file to the first node based on receiving the first boot request where providing the maintenance OS file causes the first node to instantiate a maintenance OS instance on the first node. Causing the OS provider server to provide the OS provide may further include providing a full OS file to the first node that causes the first node to instantiate a full OS instance on the first node. In one or more embodiments, the full OS instance may include the local instance of the OS provider service. In addition, the OS provider service may enable the first node to provide the maintenance OS file and the full OS file to one or more nodes at the edge location.

In one or more embodiments, the first boot request is provided via a first communication protocol. In addition, causing the OS provider server to provide the OS file to the first node may further include receiving, from the first node having the maintenance OS instance instantiated thereon, a request for the full OS file. In one or more embodiments, the request for the full OS file is communicated via a second communication protocol different from the first communication protocol. In one or more embodiments, the first communication protocol may be a dynamic host configuration protocol (DHCP) while the second communication protocol may be a hypertext transfer protocol (HTTP).

A further shown, the series of acts 500 may include an act 540 of receiving a second boot request from a second edge zone. For example, in one or more embodiments, the act 540 includes receiving, at the control plane system, a second boot request from a second node at the edge location.

As further shown, the series of acts 500 may include an act 550 of providing a second boot response to the second edge node including instructions associated with obtaining the OS file (e.g., a copy of the OS file) from the first edge node. For example, in one or more embodiments, the act 550 includes providing, to the second node in response to the second boot request and based on a determination that the OS instance is instantiated on the first node, a second boot response including instructions associated with obtaining the OS file from the first node.

In one or more embodiments, the series of acts 500 may include queuing the second boot request based on receiving the first boot request prior to receiving the second boot request and determining that the second boot request originates from a same edge location as the edge location associated with the first node.

In one or more embodiments, providing the second boot response includes providing the second boot response includes providing the instructions associated with obtaining the OS file from the first server node without causing the control plane system to provide the OS file to the second server node. Further, in one or more embodiments, providing the second boot response to the second node causes the second node to access an OS file from the first node and instantiate an OS instance on the second node. In one or more embodiments, the OS instance on the second node enables the second node to act as another local instance of the OS provider service for one or more additional nodes at the edge location.

In one or more embodiments, the first node and the second node include data plane devices that are logically connected to the control plane system via a virtual private network (VPN) between nodes of the edge location and the control plane system. Further, in one or more embodiments, the control plane system includes control plane server devices implemented on a datacenter of a cloud computing system.

Figure 6:
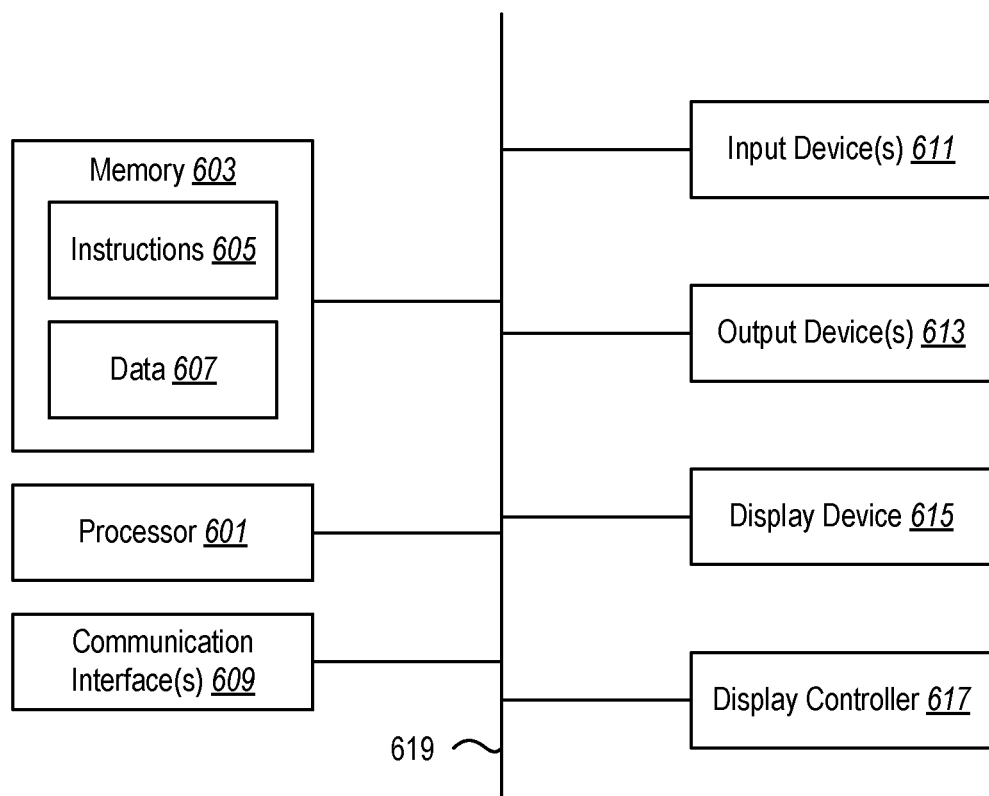
FIG. 6 illustrates certain components that may be included within a computer system.

FIG. 6 illustrates certain components that may be included within a computer system 600. One or more computer systems 600 may be used to implement the various devices, components, and systems described herein.

The computer system 600 includes a processor 601. The processor 601 may be a general-purpose single- or multi-chip microprocessor (e.g., an Advanced RISC (Reduced Instruction Set Computer) Machine (ARM)), a special purpose microprocessor (e.g., a digital signal processor (DSP)), a microcontroller, a programmable gate array, etc. The processor 601 may be referred to as a central processing unit (CPU). Although just a single processor 601 is shown in the computer system 600 of FIG. 6, in an alternative configuration, a combination of processors (e.g., an ARM and DSP) could be used.

The computer system 600 also includes memory 603 in electronic communication with the processor 601. The memory 603 may be any electronic component capable of storing electronic information. For example, the memory 603 may be embodied as random access memory (RAM), read-only memory (ROM), magnetic disk storage media, optical storage media, flash memory devices in RAM, on-board memory included with the processor, erasable programmable read-only memory (EPROM), electrically erasable programmable read-only memory (EEPROM) memory, registers, and so forth, including combinations thereof.

Instructions 605 and data 607 may be stored in the memory 603. The instructions 605 may be executable by the processor 601 to implement some or all of the functionality disclosed herein. Executing the instructions 605 may involve the use of the data 607 that is stored in the memory 603. Any of the various examples of modules and components described herein may be implemented, partially or wholly, as instructions 605 stored in memory 603 and executed by the processor 601. Any of the various examples of data described herein may be among the data 607 that is stored in memory 603 and used during execution of the instructions 605 by the processor 601.

A computer system 600 may also include one or more communication interfaces 609 for communicating with other electronic devices. The communication interface(s) 609 may be based on wired communication technology, wireless communication technology, or both. Some examples of communication interfaces 609 include a Universal Serial Bus (USB), an Ethernet adapter, a wireless adapter that operates in accordance with an Institute of Electrical and Electronics Engineers (IEEE) 802.11 wireless communication protocol, a Bluetooth® wireless communication adapter, and an infrared (IR) communication port.

A computer system 600 may also include one or more input devices 611 and one or more output devices 613. Some examples of input devices 611 include a keyboard, mouse, microphone, remote control device, button, joystick, trackball, touchpad, and lightpen. Some examples of output devices 613 include a speaker and a printer. One specific type of output device that is typically included in a computer system 600 is a display device 615. Display devices 615 used with embodiments disclosed herein may utilize any suitable image projection technology, such as liquid crystal display (LCD), light-emitting diode (LED), gas plasma, electroluminescence, or the like. A display controller 617 may also be provided, for converting data 607 stored in the memory 603 into text, graphics, and/or moving images (as appropriate) shown on the display device 615.

The various components of the computer system 600 may be coupled together by one or more buses, which may include a power bus, a control signal bus, a status signal bus, a data bus, etc. For the sake of clarity, the various buses are illustrated in FIG. 6 as a bus system 619.

The techniques described herein may be implemented in hardware, software, firmware, or any combination thereof, unless specifically described as being implemented in a specific manner. Any features described as modules, components, or the like may also be implemented together in an integrated logic device or separately as discrete but interoperable logic devices. If implemented in software, the techniques may be realized at least in part by a non-transitory processor-readable storage medium comprising instructions that, when executed by at least one processor, perform one or more of the methods described herein. The instructions may be organized into routines, programs, objects, components, data structures, etc., which may perform particular tasks and/or implement particular data types, and which may be combined or distributed as desired in various embodiments.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

As used herein, non-transitory computer-readable storage media (devices) may include RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

The steps and/or actions of the methods described herein may be interchanged with one another without departing from the scope of the claims. In other words, unless a specific order of steps or actions is required for proper operation of the method that is being described, the order and/or use of specific steps and/or actions may be modified without departing from the scope of the claims.

The term "determining" encompasses a wide variety of actions and, therefore, "determining" can include calculating, computing, processing, deriving, investigating, looking up (e.g., looking up in a table, a database, or another data structure), ascertaining and the like. Also, "determining" can include receiving (e.g., receiving information), accessing (e.g., accessing data in a memory) and the like. Also, "determining" can include resolving, selecting, choosing, establishing and the like.

The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. For example, any element or feature described in relation to an embodiment herein may be combinable with any element or feature of any other embodiment described herein, where compatible.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

The invention claimed is:

1. A method, comprising:
receiving, at a control plane system, a first boot request from a first node at an edge location);
generating, in response to the first boot request, a first boot response including an identifier for the first node and information associated with an operating system (OS) provider service on the control plane system, wherein the first boot response is transmitted via a virtual private network (VPN) using a dynamic host configuration protocol (DHCP);
causing the OS provider service to provide an OS file to the first node, wherein providing the OS file to the first node causes the first node to instantiate an OS instance on the first node, wherein the OS instance provides a local instance of the OS provider service on the first node, and wherein providing the OS file to the first node is transmitted via a different network from the VPN using hypertext transfer protocol (HTTP);
receiving, at the control plane system, a second boot request from a second node at the edge location; and
providing, to the second node in response to the second boot request and based on a determination that the OS instance is instantiated on the first node, a second boot response including instructions associated with obtaining the OS file from the first node.

2. The method of claim 1, wherein the first boot request includes a dynamic host configuration protocol (DHCP) request provided to a DHCP server on the control plane system, and wherein the first boot request is communicated via the virtual private network (VPN) tunnel connecting a plurality of nodes at the edge location and the control plane system.

3. The method of claim 2, wherein the DHCP server is located on a datacenter of a cloud computing system, the datacenter being located at a remote location from the edge location.

4. The method of claim 1, wherein generating the first boot response includes:
providing the identifier for the first node to a control plane hosting the OS provider service thereon, the identifier for the first node including an internet protocol (IP) address for the first node; and
providing the information associated with the OS provider service to the first node, the information including an IP address for the control plane hosting the OS provider service and instructions associated with obtaining the OS file from the OS provider service.

5. The method of claim 1, wherein causing the OS provider service to provide the OS file to the first node includes:
providing a maintenance OS file to the first node based on receiving the first boot request, wherein providing the maintenance OS file causes the first node to instantiate a maintenance OS instance on the first node; and providing a full OS file to the first node, wherein providing the full OS file to the first node causes the first node to instantiate a full OS instance on the first node, and wherein the full OS instance includes the local instance of the OS provider service, wherein the OS provider service enables the first node to provide the maintenance OS file and the full OS file to one or more nodes at the edge location.

6. The method of claim 5, wherein causing the OS provider service to provide the OS file to the first node further includes receiving, from the first node having the maintenance OS instance instantiated thereon, a request for the full OS file.

7. The method of claim 1, further comprising determining, by the control plane system, that the second boot request is received from a node on a same edge location as the first node having the OS instance instantiated thereon, and wherein providing the second boot response is based at least in part on determining that the second boot request is received from the node on the same edge location as the first node.

8. The method of claim 1, further comprising queuing the second boot request based on receiving the first boot request prior to receiving the second boot request and determining that the second boot request originates from a same edge location as the edge location associated with the first node.

9. The method of claim 1, wherein providing the second boot response includes providing the instructions associated with obtaining the OS file from the first node without causing the control plane system to provide the OS file to the second node.

10. The method of claim 1, wherein providing the second boot response to the second node causes the second node to access an OS file from the first node and instantiate an OS instance on the second node.

11. The method of claim 10, wherein the OS instance on the second node enables the second node to act as another local instance of the OS provider service for one or more additional nodes at the edge location.

12. The method of claim 1, wherein the first node and the second node include data plane devices that are logically connected to the control plane system via the virtual private network (VPN) between nodes of the edge location and the control plane system, the control plane system including control plane server devices implemented on a datacenter of a cloud computing system.

13. A system, comprising:
one or more processors;
memory in electronic communication with the one or more processors; and
instructions stored in the memory, the instructions being executable by the one or more processors to:
receive, at a control plane system, a first boot request from a first node at an edge location;
generate, in response to the first boot request, a first boot response including an identifier for the first node and information associated with an operating system (OS) provider service on the control plane system, wherein the first boot response is transmitted via a virtual private network (VPN) using a dynamic host configuration protocol (DHCP);
cause the OS provider service to provide an OS file to the first node, wherein providing the OS file to the first node causes the first node to instantiate an OS instance on the first node, wherein the OS instance provides a local instance of the OS provider service on the first node, and wherein providing the OS file to the first node is transmitted via a different network from the VPN using hypertext transfer protocol (HTTP);
receive, at the control plane system, a second boot request from a second node at the edge location; and
provide, to the second node in response to the second boot request and based on a determination that the OS instance is instantiated on the first node, a second boot response including instructions associated with obtaining the OS file from the first node.

14. The system of claim 13, wherein the first boot request includes a dynamic host configuration protocol (DHCP) request provided to a DHCP server on the control plane system, and wherein the first boot request is communicated via the virtual private network (VPN) tunnel connecting a plurality of nodes at the edge location and the control plane system, and wherein the DHCP server is located on a datacenter of a cloud computing system, the datacenter being located at a remote location from the edge location.

15. The system of claim 13, wherein providing the second boot response to the second node causes the second node to access an OS file from the first node and instantiate an OS instance on the second node, and wherein the OS instance on the second node enables the second node to act as another local instance of the OS provider service for one or more additional nodes at the edge location.

16. The system of claim 13, wherein the first node and the second node include data plane devices that are logically connected to the control plane system via the virtual private network (VPN) between nodes of the edge location and the control plane system, the control plane system including control plane server devices implemented on a datacenter of a cloud computing system.

17. A non-transitory computer-readable medium storing instructions thereon that, when executed by one or more processors, causes a computing device to:
receive, at a control plane system, a first boot request from a first node at an edge location;
generate, in response to the first boot request, a first boot response including an identifier for the first node and information associated with an operating system (OS) provider service on the control plane system, wherein the first boot response is transmitted via a virtual private network (VPN) using a dynamic host configuration protocol (DHCP);
cause the OS provider service to provide an OS file to the first node, wherein providing the OS file to the first node causes the first node to instantiate an OS instance on the first node, wherein the OS instance provides a local instance of the OS provider service on the first node, and wherein providing the OS file to the first node is transmitted via a different network from the VPN using hypertext transfer protocol (HTTP);
receive, at the control plane system, a second boot request from a second node at the edge location; and
provide, to the second node in response to the second boot request and based on a determination that the OS instance is instantiated on the first node, a second boot response including instructions associated with obtaining the OS file from the first node.

18. The non-transitory computer-readable medium of claim 17, wherein the first boot request includes a dynamic host configuration protocol (DHCP) request provided to a DHCP server on the control plane system, and wherein the first boot request is communicated via the virtual private network (VPN) tunnel connecting a plurality of nodes at the edge location and the control plane system, and wherein the DHCP server is located on a datacenter of a cloud computing system, the datacenter being located at a remote location from the edge location.

19. The non-transitory computer-readable medium of claim 17, wherein providing the second boot response to the second node causes the second node to access an OS file from the first node and instantiate an OS instance on the second node, and wherein the OS instance on the second node enables the second node to act as another local instance of the OS provider service for one or more additional nodes at the edge location.

20. The non-transitory computer-readable medium of claim 17, wherein the first node and the second node include data plane devices that are logically connected to the control plane system via the virtual private network (VPN) between nodes of the edge location and the control plane system, the control plane system including control plane server devices implemented on a datacenter of a cloud computing system.

\* \* \* \* \*